(12) United States Patent
Jaspers

(10) Patent No.: US 6,727,945 B1
(45) Date of Patent: Apr. 27, 2004

(54) COLOR SIGNAL INTERPOLATION

(75) Inventor: Cornelis A. M. Jaspers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/238,201

(22) Filed: Jan. 27, 1999

(30) Foreign Application Priority Data

Jan. 29, 1998 (EP) ............................................. 98200261

(51) Int. Cl.$^7$ .......................... H04N 3/14; H04N 5/335; H04N 9/04; H04N 9/083
(52) U.S. Cl. ........................ 348/272; 348/273; 348/241
(58) Field of Search ................................ 348/272, 273, 348/280, 241; 382/260, 300, 162, 167

(56) References Cited

U.S. PATENT DOCUMENTS

| | | | | |
|---|---|---|---|---|
| 5,333,055 A | * | 7/1994 | Murata et al. .............. | 348/239 |
| 5,382,976 A | * | 1/1995 | Hibbard ...................... | 348/273 |
| 5,506,619 A | * | 4/1996 | Adams et al. .............. | 348/272 |
| 5,652,621 A | * | 7/1997 | Adams et al. .............. | 348/272 |
| 6,130,960 A | * | 10/2000 | Acharya ...................... | 382/167 |
| 6,570,616 B1 | * | 5/2003 | Chen .......................... | 348/272 |
| 2002/0167602 A1 | * | 11/2002 | Nguyen ...................... | 348/280 |

* cited by examiner

*Primary Examiner*—Andrew Christensen
*Assistant Examiner*—Eric Wisdahl
(74) *Attorney, Agent, or Firm*—Aaron Waxler

(57) ABSTRACT

In a method of interpolating an output color signal (Go) of a given color in dependence on an input signal (RGBin) having first values of the given color which are influenced by a first other color and second values of the given color which are influenced by a second other color, an intermediate color signal (Gc') is interpolated (1) at positions where no signal of the given color is present, an average value (avG) of the given color is generated (3) in dependence upon both the first and second values, and the output color signal (Go) is furnished (5) in dependence upon both the intermediate color signal (Gc') and the average value (avG).

9 Claims, 1 Drawing Sheet

COLOR SIGNAL INTERPOLATION

BACKGROUND OF THE INVENTION

1. Field of the Invention

The invention relates to interpolation of color signals, and more specifically, to restoration of Green uniformity of RGB Bayer sensors.

2. Description of the Related Art

RGB Bayer sensors have an alternating color pattern of rows having RGRG etc., colored pixels, and GBGB etc., colored pixels. In the vertical direction of a 'Red' column, a Green pixel has only Red pixels as vertically neighboring pixels, while in a 'Blue' column, a Green pixel has only Blue pixels as vertically neighboring pixels. Depending on the quality of the vertical color separation of the sensor, the Green pixels can be modulated by the amount of electron charge in the Red and Blue pixels. If so, then for certain colored scenes, this may result in a visible column-wise Green non-uniformity. A nice example is a highlighted Cyan color, which, theoretically has no Red but only Blue and Green. This will result in a different Green for the Red and Blue columns, which can be visible on a display or on a printout especially because of its regularity. A stylistic example of the column-wise modulation of Green by the electron charges of the Red and Blue pixels is shown in FIG. 1.

SUMMARY OF THE INVENTION

It is, inter alia, an object of the invention to reduce this Green non-uniformity without losing resolution. To this end, a first aspect of the invention provides a method and a device for interpolating an output color signal. A second aspect of the invention provides a camera including such a device.

In a method of interpolating an output color signal of a given color in dependence on an input signal having first values of the given color which are influenced by a first other color, and second values of the given color which are influenced by a second other color, in accordance with a primary aspect of the present invention, an intermediate color signal is interpolated at positions where no signal of the given color is present, an average value of the given color is generated in dependence upon both the first and second values, and the output color signal is furnished in dependence upon both the intermediate color signal and the average value.

These and other aspects of the invention will be apparent from and elucidated with reference to the embodiments described hereinafter.

DESCRIPTION OF THE PREFERRED EMBODIMENTS

Figure 2:
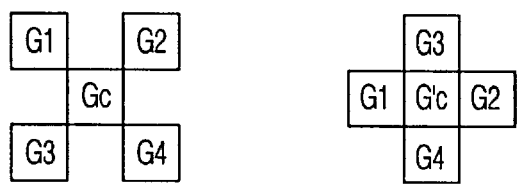
FIG. 2 indicates a present Green center pixel Gc and four present Green neighboring pixels G1–G4, as well as a reconstructed Green center pixel Gc' and four present Green neighboring pixels G1–G4.

In case of a signal processing with two row delays, FIG. 2 shows the declaration of the surrounding Green pixels if Green is present (left) or absent (right). In the latter case, the missing center Green pixel Gc' is reconstructed by means of an RGB reconstruction filter 1 in FIG. 4. Preferably, the RGB reconstruction filter is of the type described in European Patent Application No. EP 97401700.616,466), filed on Jul. 15, 1997, corresponding to U.S. patent application Ser. No. 09/116,323, filed Jul. 15, 1998 incorporated herein by reference.

In practice, it appears that the Green non-uniformity is limited to a certain maximum, for instance, 5%, of the Green signal amplitude. This Green non-uniformity level Th is preferably adjustable by means of the core of the camera processing. The goal of the Green uniformity restoration is that above that level Th, no resolution loss will occur, but that below that level, the center Green will be replaced by an averaged Green value of the surrounding green pixels.

The algorithm for Green uniformity restoration which yields the output Green value Go:

$$avG=(G1+G2+G3+G4)/4$$

if the center Green pixel Gc' has to be interpolated, then

```
begin
    if abs((G1+G2−G3−G4)/2) < Th then
            Go = avG
    else    Go = Gc' (the reconstructed Green)
end
``` else (the center Green pixel Gc is present)

```
begin
    if abs(avG-Gc) < Th
        then        Go = (Gc+avG)/2
        else        Go = Gc
end
```

Figure 3:
FIG. 3 indicates a present Green center pixel Gc and two present Green neighboring pixels G1–G2, as well as a reconstructed Green center pixel Gc' and three present Green neighboring pixels G1–G3.

In case of a signal processing with only one row delay, only the pixels illustrated in FIG. 3 are available. In that case, the algorithm for Green uniformity restoration is:

$$avG=(G1+G2)/2$$

if the center Green pixel Gc' has to be interpolated then

```
begin
    if abs(avG-G3) < Th
        then    Go = (avG+G3)/2
end
``` else (the center Green pixel Gc is present)

```
begin
    if abs(avG-Gc) < Th
        then        Go = (Gc+avG)/2
        else        Go = Gc
end
```

Figure 1:
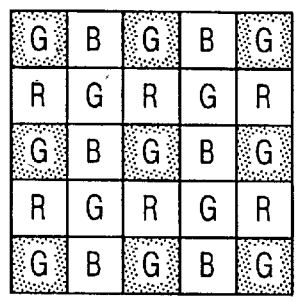
FIG. 1 shows an RGB Bayer sensor in which the Green signal in the columns with Red pixels differs from the Green signal in the columns with Blue pixels.
Figure 4:
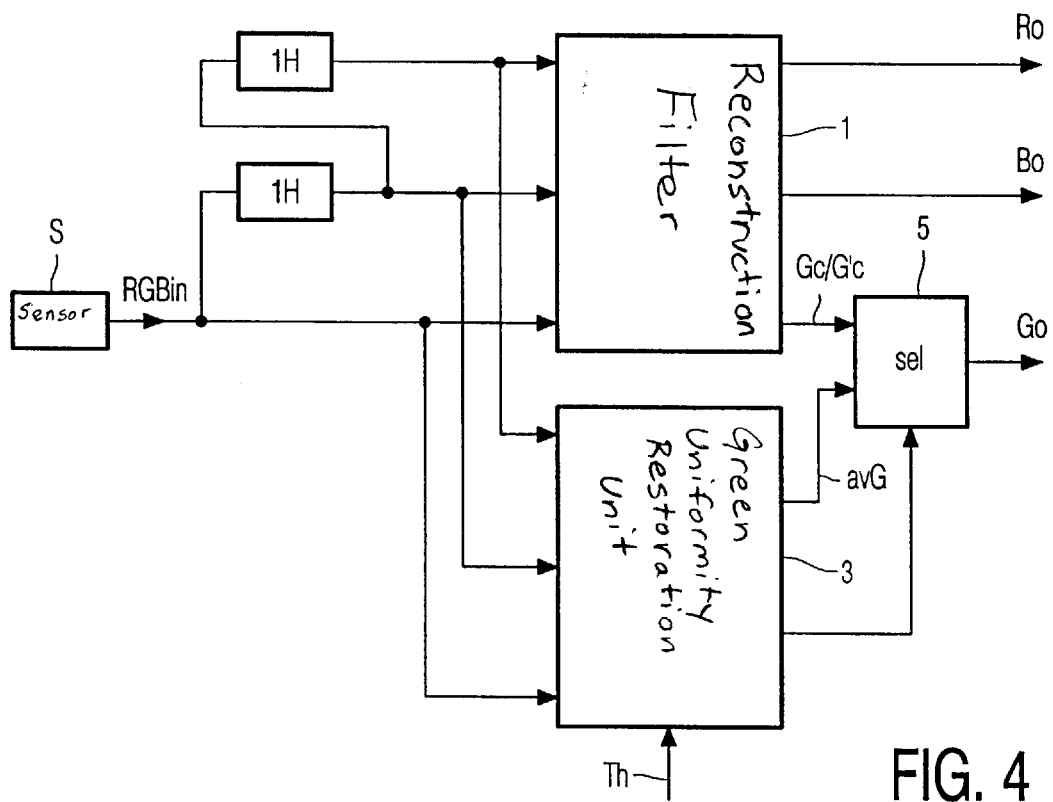
FIG. 4 shows a block diagram of a camera in accordance with the present invention.

A block diagram of how to combine the RGB reconstruction and the Green uniformity restoration is shown in FIG. 4. An RGB input signal RGBin from a sensor S is applied to an RGB reconstruction filter 1 and to a Green uniformity restoration unit 3, in a present version, in a once line delayed version, and in a twice line-delayed version. The RGB reconstruction filter, interpolates missing red, green and blue pixels values on the basis of the signals applied to the filter in which, as apparent from FIG. 1, at each pixel position, only one of the three colors R, G and B is present. A select box 5 selects between the original center Green pixel value Gc or a reconstructed center Green value Gc' from the RGB reconstruction filter 1, and the averaged Green signal avG from the Green uniformity restoration unit 3. If the edges in the Green area are smaller than the level Th, then the average Green value avG is selected. If the edges in the Green area are larger than the level Th, i.e., when high frequencies above that level Th have been detected, then the signal Gc or Gc' from the RGB reconstruction filter 1 will be selected.

By leaving out the upper horizontal line delay in the block diagram of FIG. 4, the circuit can be used for the single row RGB reconstruction and Green uniformity restoration on the basis of the pixels shown in FIG. 3.

Tests with pictures of existing Bayer image sensors, having, column wise Green non-uniformity, proved that the mentioned algorithms eliminate that non-uniformity and maintain the resolution. The estimated improvement in signal-to-noise ratio is about 2 to 3 dB. (The estimation has been done by adding noise until both pictures give the same impression.) This improvement also holds for fixed pattern noise. Further, this circuit can be applied for averaging the dark current of the image sensor.

The following salient features of the invention are noteworthy. The restoration of the Green uniformity of RGB Bayer image sensors without resolution loss. The restoration with the already available row delays needed for the RGB reconstruction. The inherent signal-to-noise improvement and possibility to filter the dark current of the sensor.

It should be noted that the above-mentioned embodiments illustrate rather than limit the invention, and that those skilled in the art will be able to design many alternative embodiments without departing from the scope of the appended claims. For example, instead of the average value avG, a median value or any other low-pass filtered green signal can be used as long as it combines Green from at least one Red column and Green from at least one Blue column; any such alternatives are included by the expression "average value" in the claims. The invention can be implemented by means of hardware comprising several distinct elements, and by means of a suitably programmed computer. In the device claim enumerating several means, several of these means can be embodied by one and the same item of hardware.

What is claimed is:

1. A method of interpolating an output signal of a given color in dependence upon an input signal having first values of the given color, which are influenced by a first other color and second values of the given color which are influenced by a second other color, the method comprising:

interpolating an intermediate color signal at positions where no signal of the given color is present, wherein the interpolating includes determining a difference between the first values of the given color and the second values of the given color;

generating an average value of the given color in dependence upon both of the first and second values;

selecting between an original value of the given color or the intermediate color signal, and the average of the given color, responsive to a non-uniformity threshold level of the given color; and furnishing the output color of the given color.

2. A method as recited in claim 1, wherein the average value of the given color is chosen if edges of a pixel of the given color are less than the non-uniformity threshold level.

3. A method as recited in claim 1, wherein either the original value of the given color or the intermediate color signal is chosen if edges of a pixel of the given color are greater than the non-uniformity threshold level.

4. A device that interpolates an output signal of a given color in dependence upon an input signal having first values of the given color that are influenced by a first other color and second values of the given color that are influenced by a second other color, the device comprising:

a reconstruction filter which interpolates an intermediate color signal at positions where no signal of the given color is present, wherein the interpolation includes determining a difference between the first values of the given color and the second values of the given color;

a uniformity restoration unit which generates an average value of the given color in dependence upon both of the first and second values; and a selector which selects between an original value of the given color or the intermediate color signal, and the average value of the given color, responsive to a non-uniformity threshold level of the given color, and which furnishes the output color of the given color.

5. A device as recited in claim 4, wherein the average value of the given color is chosen if edges of a pixel of the given color are less than the non-uniformity threshold level.

6. A device as recited in claim 4, wherein either the original value of the given color or the intermediate color signal is chosen if edges of a pixel of the given color are greater than the non-uniformity threshold level.

7. A camera, comprising:

a sensor that furnishes an input signal having first values of a given color that are influenced by a first other color and second values of the given color that are influenced by a second other color; and a device which interpolates an output signal of a given color in dependence upon said input signal, the device comprising:

a reconstruction filter which interpolates an intermediate color signal at positions where no signal of the given color is present;

a uniformity restoration unit which generates an average value of the given color in dependence upon both of the first and second values; and a selector which selects between an original value of the given color or the intermediate color, and the average value of the given color, responsive to a non-uniformity threshold level of the given color, and which furnishes the output color of the given color, wherein the interpolation includes determining a difference between the first values of the given color and the second values of the given color.

8. A device as recited in claim 7, wherein the average value of the given color is chosen if edges of a pixel of the given color are less than the non-uniformity threshold level.

9. A device as recited in claim 7, wherein either the original value of the given color or the intermediate color signal is chosen if edges of a pixel of the given color are greater than the non-uniformity threshold level.

* * * * *